United States Patent [19]

Owen et al.

[11] 4,333,139
[45] Jun. 1, 1982

[54] STATIC INVERTER

[75] Inventors: Daniel V. Owen; Alan M. Smith, both of Hendersonville, N.C.

[73] Assignee: General Electric Company, Schenectady, N.Y.

[21] Appl. No.: 206,863

[22] Filed: Nov. 14, 1980

[51] Int. Cl.³ .............................................. H02P 13/20
[52] U.S. Cl. ........................................ 363/97; 363/18; 315/DIG. 7
[58] Field of Search ...... 315/209 T, DIG. 2, DIG. 5, 315/DIG. 7; 363/18, 97, 131; 336/172, 182, 183

[56] References Cited

U.S. PATENT DOCUMENTS 4,202,031   5/1980   Hesler et al. ............................ 363/97

Primary Examiner—William M. Shoop
Attorney, Agent, or Firm—Ernest W. Legree; Lawrence R. Kempton; Philip L. Schlamp

[57] ABSTRACT

Static inverter comprises a transformer and transistor for intermittent asymmetric energization of the transformer. The transformer includes three feedback windings which in response to saturation of a branch of the transformer core but before full core saturation discontinue regenerative feedback and then apply degenerative feedback. A fourth feedback winding in the transformer assures commutation and re-triggering of the transistor.

6 Claims, 3 Drawing Figures

STATIC INVERTER

The present invention relates to static inverters for converting electrical energy in direct current form to alternating current form, and more particularly concerns an improvement in the static inverters disclosed in U.S. Pat. No. 4,202,031 of Hesler et al, issued May 6, 1980 and assigned to the same assignee as the present invention.

It is a general object of the invention to provide an improved static inverter of the above type.

A particular object of the invention is to provide, in an inverter circuit of the above type which incorporates a controlled switch, an improved control device which serves to assure commutation and re-triggering of the controlled switch.

It is another object of the invention to provide an inverter circuit of the above type producing a high frequency output voltage of substantially constant peak amplitude.

A further object of the invention is to provide an inverter circuit of the above type which avoids excessive (overshoot) voltage when turned on.

Still another object of the invention is to provide an inverter circuit of the above type which is suitable for use in starting and re-starting high intensity gaseous discharge lamps, such as high pressure sodium lamps.

Other objects and advantages will become apparent from the following description and the appended claims.

With the above objects in view, the present invention in one of its aspects relates to a static inverter comprising input terminals for connection to a direct current source, inductive means comprising a core of substantially linear magnetic material having a closed main magnetic path and including a small aperture in a segment of the magnetic path which partitions the cross-section thereof into two branches and creates a low reluctance closed flux path, a primary power winding encircling the full core cross-section for generating flux around the main magnetic path, a second power winding encircling the full core cross-section and connected across the direct current source, a diode connected in series between the second power winding and the direct current source, a feedback control winding in series with the second power winding encircling one of the magnetic path branches for generating a flux around the low reluctance closed path having the same direction as the main flux in one of the branches and an opposite direction in the other branch, and a controlled switch having control, common and output electrodes for intermittent energization of the inductive means from the direct current source, the controlled switch connected in series with the primary power winding, whereby the feedback control winding serves to assure commutation and re-triggering of the controlled switch.

The invention will be better understood from the following description taken in conjunction with the accompanying drawings, in which.

Figure 1:
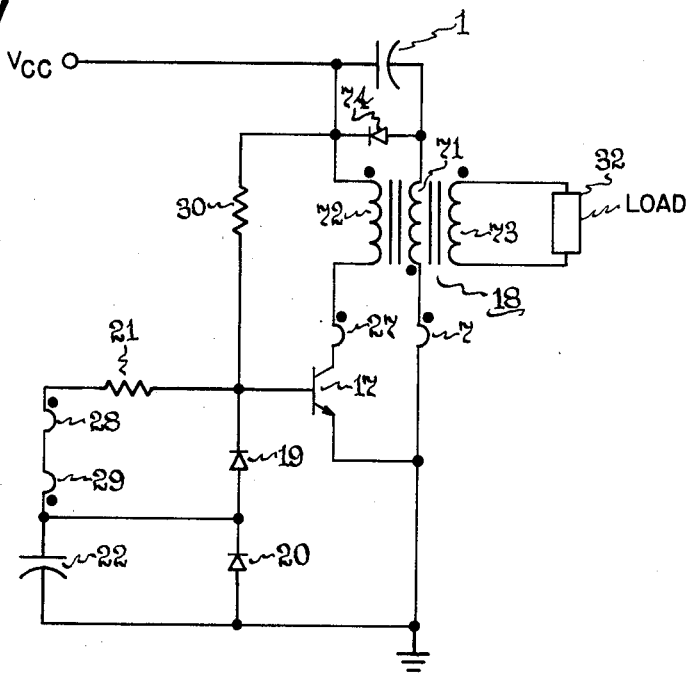
FIG. 1 is a circuit diagram of a static inverter employing an oscillator circuit embodying the present invention.

Referring now to the drawings, and particularly to FIG. 1, there is shown a static inverter of the type disclosed in the aforementioned Hesler et al patent, and as there disclosed the inverter comprises a power transistor 17, a power transformer 18 and circuit elements 19, 20, 21, 22, 30 associated with the starting and control of transistor 17, the combination functioning as a free running forward converter or oscillator. Transformer 18 in the illustrated circuit comprises primary winding 72, demagnetizing winding 71, and secondary winding 73, as well as three feedback windings 27, 28, 29.

Figure 2:
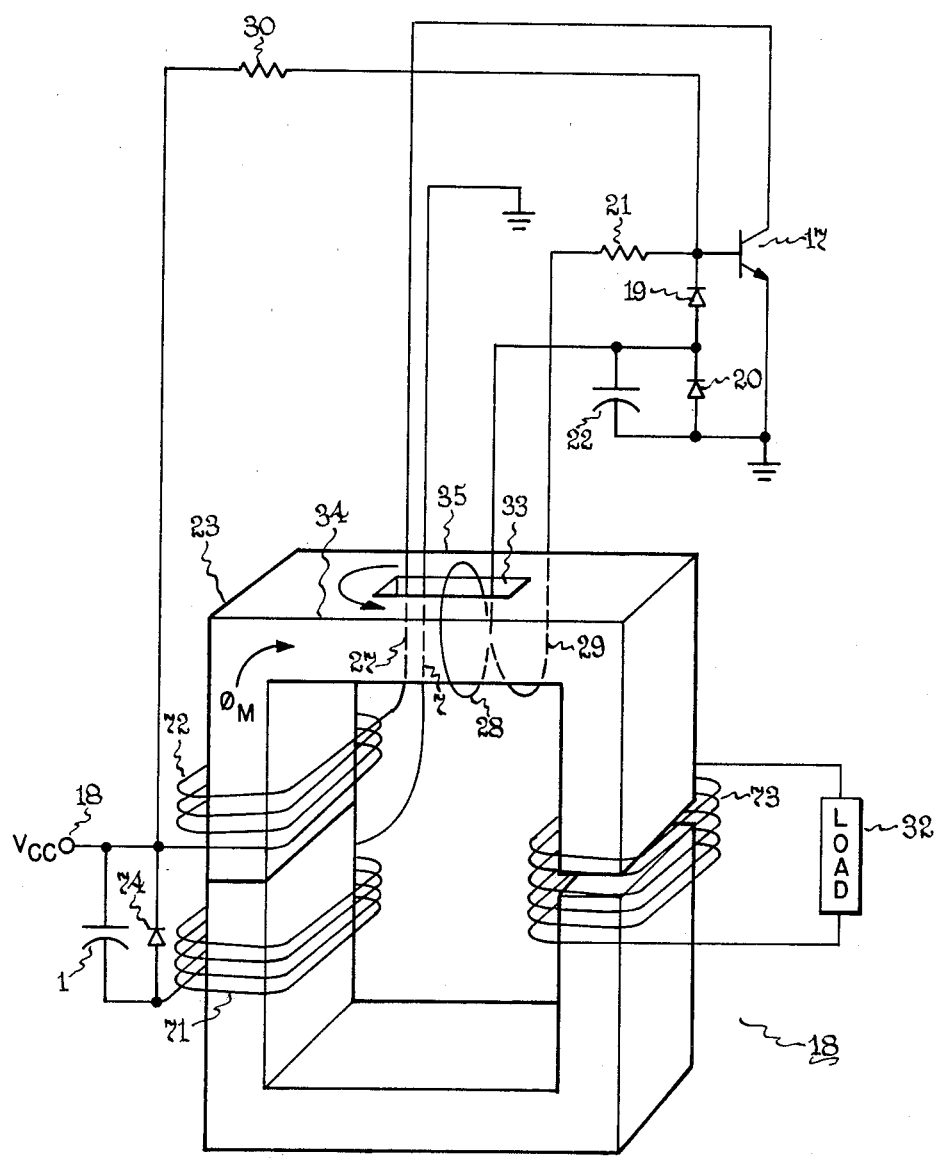
FIG. 2 is a somewhat diagrammatic representation of the transformer employed in the FIG. 1 circuit and the circuitry associated therewith.

As seen in FIG. 2, transformer 18 has a ferrite core 23 comprising two "C" cores assembled in a closed configuration and forming the main magnetic flux path. An air gap on one or both sides introduces additional linear reluctance in the main flux path. The design has a substantial primary to secondary leakage inductance. A rectangular aperture 33 provided in one leg of one "C" core as shown divides the core cross-section into two localized branches 34, 35.

Transformer feedback windings 27, 28, 29 may either aid or oppose transistor conduction depending upon the condition of saturation of a branch at aperture 33. Winding 27 is the primary feedback winding exercising a control function and windings 28, 29 are secondary feedback windings.

All three feedback windings are of a few turns, typically one or two, and each is led through the aperture 33 so that each embraces only one branch of the aperture. The primary feedback control winding 27 causes a flux to circulate about the low reluctance path around the aperture 33. When this flux is combined with the main flux, the branch in which the two fluxes add (branch 34) will saturate in the normal conduction phase of the oscillator. The other branch, (branch 35) in which the fluxes are of opposite sense, will ordinarily never saturate. Which branch saturates is established by the sense of the feedback control winding 27 and the point at which saturation occurs is established by the turns ratio and the impedance in the control circuit. The feedback windings 28 and 29 encircle the core branches 34 and 35, respectively, and are serially connected so as to form a figure eight. This disposition and interconnection of secondary feedback windings 28 and 29 causes the induction of voltages in the same sense when the flux circulates around the aperture 33. Thus, the primary control winding 27 and feedback windings 28 and 29 form a current transformer with a virtual toroidal core having a one turn primary and a two turn secondary causing the current in the secondary feedback winding to be approximately half that of the primary feedback winding. Should branch 34 saturate, however, or either branch for that matter, the low impedance path for flux about the aperture is substantially interrupted. The virtual toroid is destroyed, and current transformer feedback action is suspended. The feedback windings 28 and 29 are designed to induce conduction influencing voltages suitable for transistor control as the main flux changes in the core branches 34 and 35. Assuming that neither branch is saturated, increasing main flux induces a voltage in one sense in the winding 28 and in the opposing sense in the winding 29 since the two are wound in the opposite sense. Since they are serially interconnected, the two opposing voltages due to increasing main flux may substantially cancel, particularly if the aperture 33 is centered and the branches 34, 35 are symmetric. Should branch 34 saturate, no further voltage increases will occur in the winding 28. As the main flux increases, any additional voltage developed in the other feedback winding 29 will be unopposed.

As will be explained, the feedback windings 28 and 29 are interconnected with the input electrodes of the power transistor 17 in a sense that current transformer action occurring when the transistor in conducting normally and before saturation of branch 34 produces a conduction aiding or regenerative feedback. After the first branch (34) saturates, the feedback due to winding 29 is conduction opposing or degenerative. These two mechanisms are useful in effecting an efficient control of the transistor 17.

The windings and circuit elements of the static inverter are interconnected as follows: The path for dc input current to the inverter comprises the transformer primary winding 72, the primary feedback control winding 27, and the transistor 17 in series. The collector of transistor 17 is coupled through the serially connected windings 72, 27 to terminal Vcc. The emitter of transistor 17 is coupled to ground. Due to the serial connection, primary current flow is dependent on the state of conduction of the transistor 17. Intermittent conduction by the transistor 17 causes intermittent primary current flow in the primary winding 72, a corresponding variation in the flux in the core 23 and a corresponding induction of an alternating voltage in the secondary winding 73.

The base of transistor 17 is connected to a starting and control network consisting of resistance 30, diodes 19 and 20, secondary feedback windings 28, 29, resistance 21 and capacitor 22. The resistance 30 is connected between terminal Vcc and the base of transistor 17. The transistor base is also connected to the cathode of the diode 19, and anode of which is coupled to the cathode of diode 20. The anode of diode 20 is coupled to ground. The resistance 21, the secondary winding 28 and the secondary winding 29 are serially connected in the order recited between the cathode and anode of diode 19. The capacitor 22 is connected in shunt with the diode 20.

The transistor starting circuitry may be regarded as primarily comprising the resistor 30 and secondarily the diodes 19 and 20 associated with the base electrode of transistor 17. The resistor 30 has a large value (270K) selected to allow a 0.5 milliampere current to flow from terminal Vcc into the base circuitry. The current flows into the capacitor 22 initially. When the capacitor 22 is charged to the forward conduction potential of the base-emitter junction, the current into the capacitor stops and current flow into the base begins. Diversion of any further current away from the base during starting is prevented by the diode 20, which is poled to oppose this direction of dc current flow, and the capacitor 22, which blocks direct current flow when charged.

The operating point of the transistor 17 and more particularly its base to emitter potential is set by the capacitor 22 operating in conjunction with diode 20. Once started, and operating normally, the collector-base junction of transistor 17 becomes forward biased on cyclical negative swings of the transformer primary voltage. In this condition, current is drawn from ground through diodes 19 and 20, charging the ungrounded terminal of capacitor 22 negatively with respect to ground. The capacitor has sufficient capacity to maintain this charge from cycle to cycle and applies an approximately −0.7 volts dc bias to the base of the transistor 17. This negative bias insures cut-off operation of the transistor during flyback but is often optional.

Passive means for protection of transistor 17 from the potential high voltage surge includes diode 74 in series with demagnetizing winding 71, the latter being closely coupled to primary winding 72.

Capacitor 1 is a storage capacitor connected across diode 74 and serves to provide a current pulse to trigger the transistor switch on, to thereby assure free-running operation of the oscillator.

In accordance with the present invention, an additional feedback winding 7 is provided in transformer 18 connected in series with demagnetizing winding 71 and passing through core aperture 33 as shown in FIG. 2. The purposes of the additional winding 7 and the advantages thereof are explained more fully hereinafter.

Figure 3:
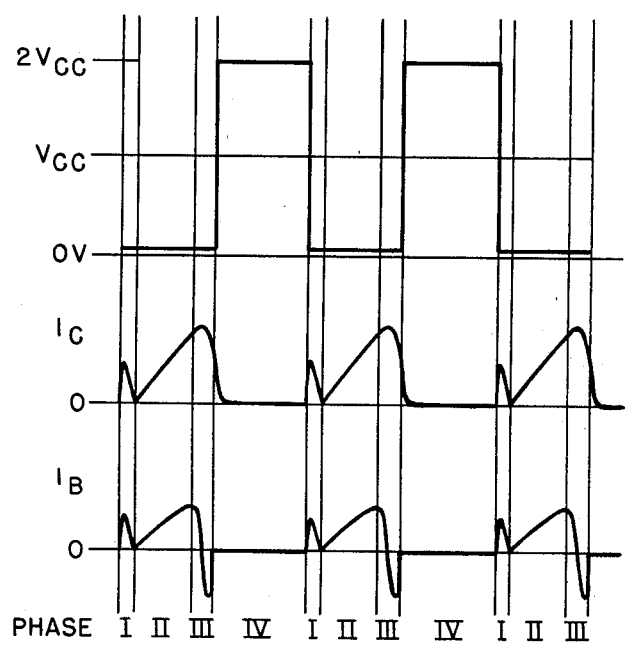
FIG. 3 illustrates waveshapes relating to the operation of the oscillator circuit of FIG. 1.

The forward converter of FIG. 1 passes through four phases in a normal oscillatory run cycle. The identifying characteristics of these phases are illustrated in the three waveforms of FIG. 3 to which reference will be made as the discussion progresses. The onset of oscillation is anomalous in that energy is not distributed to the energy storage elements, and commences with the buildup of normal conduction in the transistor 17. This corresponds most closely to Phase II.

During normal transistor conduction (the input junction is forward biased and the collector to emitter voltage is sufficiently low to cause "saturation" and reduced current gain- but the direction of collector current flow is normal), corresponding to the Phase II, the inverter primary current flows serially through the transformer winding 72, exiting at the undotted terminal (see FIG. 1), through feedback control winding 27, and into the collector electrode. As shown in FIG. 2, assuming that a current flow in the primary winding 72 generates a clockwise primary magnetization flux around the core 23 (viewing the front face of the core), the primary feedback control winding 27 passing up through aperture 33 will generate a counterclockwise flux around the aperture 33 (as viewed looking down at the top leg of the core). The main and control fluxes add in the branch 34 on the front side of the aperture 33, and subtract in the branch 35 on the back side of the aperture, thus causing a large flux in the branch 34 and a small flux in the branch 35. As previously noted, the secondary winding 28 is coupled about the branch 34, while the secondary winding 29 is coupled about the branch 35. In respect to the main flux, the voltages induced in windings 28 and 29 subtract and substantially cancel one another to produce a negligible output. In respect to the control flux, the voltages induced add, and produce the regenerative current transformer action described earlier. During the period that collector current is increasing and the branch 34 still unsaturated, substantial regenerative current feedback is applied to the base electrode of transistor 17. The mechanism is an essentially current transformer action with a low impedance termination on winding 28 relative to the source impedance. The secondary feedback winding 28 is connected in series with the secondary feedback winding 29 and capacitor 22, shunted by diode 20, between the base and emitter of transistor 17. During Phase II, both windings 28 and 29 are active and the capacitor and diode 20 provide a low impedance path to the emitter for the current induced in the windings 28 and 29. The windings are poled to increase base current as the collector current increases, and produce a substantially linear increase in collector current. The effect is regenerative and the transistor conducts the primary current demanded by the inductance of the transformer and the applied voltage. As the flux grows in the branch 34, that branch saturates and regenerative current feedback ceases.

Cessation of regenerative feedback in winding 28 initiates Phase III, at the end of which conduction of the transistor is terminated. Under the influence of the applied voltage, the inductance, and the presence of stored charge, the collector current will continue to increase past saturation of the first branch, even after the regenerative drive terminates. When saturation of the branch 34 has occurred, increases in the main flux now must flow into the second branch 35 and a feedback voltage is induced in the winding 29 (unopposed by induced voltage in winding 28). The winding 29 is connected in circuit with the base electrode in a sense to decrease base current, to decrease collector current conduction and to achieve a degenerative effect. These conditions produce voltage transformation between the windings 72 and 27 acting as a primary and winding 29 acting as a secondary. The saturation of branch 34 precludes circulating flux around aperture 33 and increases the reluctance to the flux created by winding 27. The effect of the flux due to winding 27 may normally be neglected in view of its proportionately few turns in respect to primary winding 72. Ideally, the flux from winding 27 adds to the main flux in the unsaturated branch and increases the effective turns by one turn. The winding 28 is still serially connected with winding 29, but assuming full saturation of branch 34, no further voltage is induced in winding 28, and it serves as a low impedance connection of the voltage induced in winding 29 to the base circuit of transistor 17. When voltage transformer action is taking place, the intensity of the applied degenerative voltage may be controlled by the small serially connected resistance 21. Under the influence of secondary feedback winding 29, the base drive back biases the input junction. After stored charge has been removed, conventional transistor conduction ceases. The resistance 21 sets the rapidity of the turn off.

With transistor 17 non-conductive, Phase IV or the flyback phase of the cycle commences. At the instant that transistor 17 becomes non-conductive, the field established by winding 72 collapses about winding 71, making the undotted terminal more positive than the direct current source and allowing the energy to be fed back into the Vcc terminal through diode 74 and capacitor 1. While this energy transfer is taking place, transistor 17 is effectively maintained in the off condition by the reverse current being induced in feedback windings 28 and 29 by the current flowing in feedback control winding 7. When this field has been reduced essentially to zero, the stored charge built up in diode 74 coupled with the charge on capacitor 1 equalizes by discharging through winding 71 and feedback winding 7. This discharge current through winding 7, marking the beginning of Phase I, causes a regenerative feedback to transistor 17 through winding 28. Ultimately, this feedback current initiates transistor turn-on, marking the beginning of Phase II.

By virtue of the provision of feedback winding 7 as described, improved commutation and re-triggering of transistor switch 17 is achieved. Moreover, the improved inverter produces a high frequency voltage of substantially constant peak amplitude, and in addition avoids excessive turn-on voltage.

The described inverter is suitable for use in circuits for starting and re-starting gaseous discharge lamps such as disclosed in co-pending application of Collins, Ser. No. 201014, Filed Oct. 27, 1980, and assigned to the same assignee as the present invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A static inverter comprising;
   A. input terminals for connection to a direct current source,
   B. inductive means comprising:
      (1) a core of substantially linear magnetic material having a closed main magnetic path and including a small aperture in a segment of the said path which partitions the cross-section of said main magnetic path into two branches and creates a low reluctance closed flux path,
      (2) a primary power winding encircling the full core cross-section for generating flux around said main magnetic path,
      (3) a second power winding encircling the full core cross-section and connected across said direct current source,
      (4) a diode connected in series between said second power winding and said direct current source,
      (5) a feedback control winding in series with said second power winding encircling one of said branches for generating a flux around said low reluctance closed path having the same direction as said main flux in one of said branches and an opposite direction of the other branch, and
   C. a controlled switch having control, common and output electrodes for intermittent energization of the inductive means from said direct current source, said controlled switch connected in series with said primary power winding,
whereby said feedback control winding serves to assure commutation and re-triggering of said controlled switch.

2. An inverter as defined in claim 1, and a capacitor in parallel with said diode for providing storage of energy for cyclically initiating turn-on of said controlled switch.

3. An inverter as defined in claim 1, said feedback control winding being connected between said second power winding and one of said input terminals.

4. An inverter as defined in claim 1, including a second feedback control winding encircling said one branch, a third feedback winding encircling said one branch, and a fourth feedback winding encircling said other branch, said primary power winding, said second feedback control winding and said controlled switch being serially connected between said input terminals, and said third feedback winding and said fourth feedback winding being serially connected between said control and common electrodes.

5. An inverter as defined in claim 4, said first-mentioned feedback control winding being arranged in said aperture such that forward current in said diode and said first-mentioned feedback control winding induces a current in said third and fourth feedback windings that tends to turn off said controlled switch, and a reverse current in said diode and said first mentioned feedback control winding initiates the turn on of said controlled switch.

6. An inverter as defined in claim 1, wherein said second power winding is closely magnetically coupled to said first power winding.

* * * * *